Sept. 15, 1959  J. R. WALL ET AL  2,904,063
FLOW CONTROL MECHANISM
Filed Sept. 19, 1955
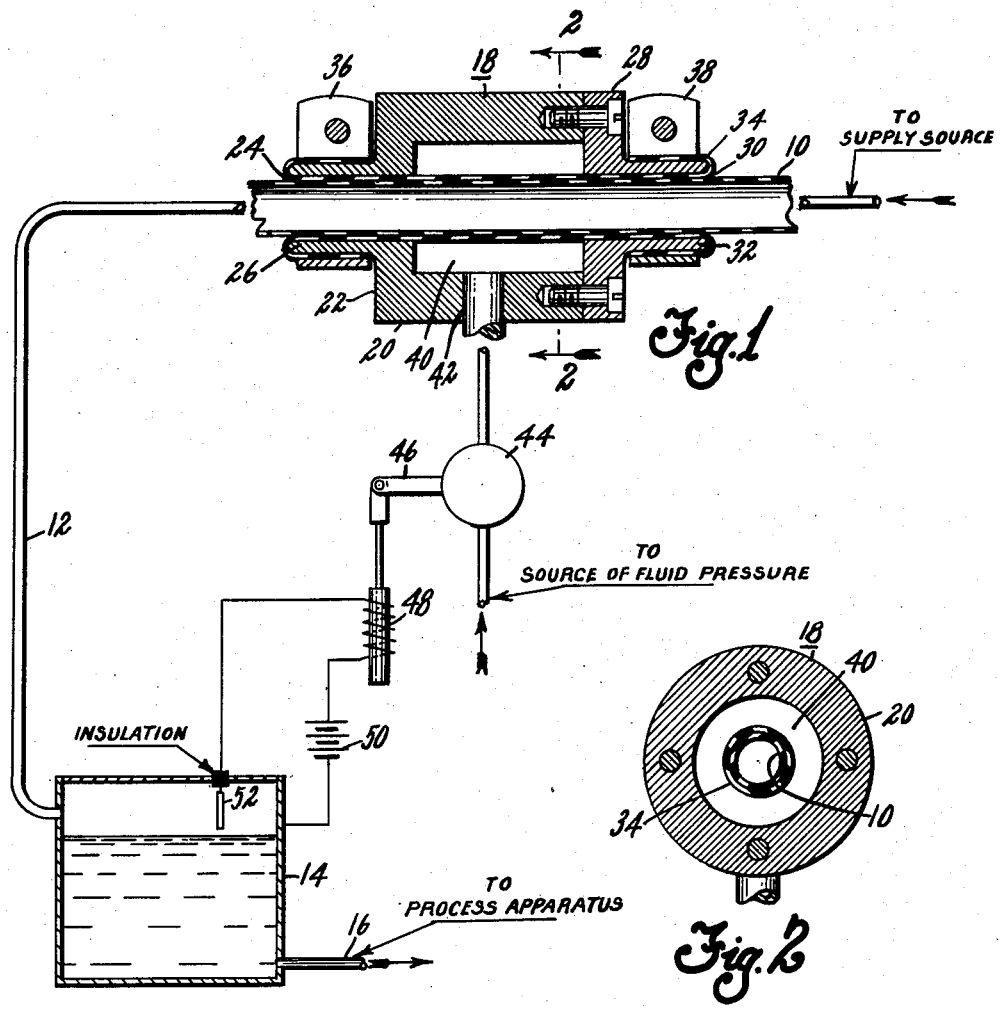
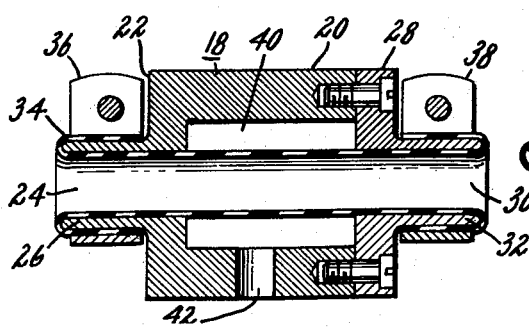
INVENTORS
JAMES R. WALL
ROBERT D. POWELL
BY
THEIR ATTORNEY

United States Patent Office 2,904,063
Patented Sept. 15, 1959

2,904,063

FLOW CONTROL MECHANISM

James R. Wall, Dayton, and Robert D. Powell, Trotwood, Ohio, assignors to General Motors Corporation, Detroit, Mich., a corporation of Delaware Application September 19, 1955, Serial No. 535,149

2 Claims. (Cl. 137—392)

This invention relates to apparatus for controlling the rate of flow of a flowable material through a conduit or the like.

In many processes or systems involving the flow of material through a conduit, it is essential that the flow rate be varied to correspond to the requirements of the process or system. For example, in instances where a process requires the use of a material at a constant rate, it may be inconvenient to provide a supply source which supplies the material to the process at a constant rate and a means for varying the supply rate so that the delivery rate to the process is constant, may be essential. Similarly, where the supply rate of a material is essentially constant but the use thereof varies, it may be essential to provide means for varying the supply rate to correspond to the rate of its use.

It is, accordingly, an object of the present invention to provide apparatus for controlling the flow of material through a conduit to a container which includes a flexible tube portion forming a portion of the conduit, means for constricting the flexible tube portion, and means for actuating the constricting means when the material in the container attains a predetermined level or quantity.

It is another object of this invention to provide an apparatus for controlling the flow of material through a conduit which includes a flexible tube portion through which the material is caused to flow, an inwardly expansible fluid pressure chamber disposed about the flexible tube portion, and means for admitting fluid under pressure to the pressure chamber whereby the flexible tube portion is constricted within the pressure chamber to reduce the flow rate of material therethrough.

Further objects and advantages of the present invention will be apparent from the following description, reference being had to the accompanying drawings wherein preferred embodiments of the present invention are clearly shown.

In the drawings:

Figure 1 shows in diagrammatic form an arrangement wherein the flow rate of a flowable material into a container is controlled in response to the level of material in the container and wherein the flow control mechanism, shown as a cross-sectional side view, is in the form of a flexible tube having disposed thereabout an inwardly expansible pressure chamber.

Figure 2 is a cross-sectional view taken along line 2—2 of Figure 1.

Figure 3 is a cross-sectional side view of the inwardly expansible chamber shown in Figure 1.

Referring to the drawings, Figure 1 illustrates the control mechanism of the present invention. A flowable material passes from a supply source (not shown) through a flexible tube portion 10, through a conduit 12 to a supply tank or container and through a conduit 16 to a process apparatus (not shown) or other place wherein the material is used.

The control mechanism of the present invention, in a preferred form, may be seen in reference to Figures 1, 2 and 3. It includes a tube portion 10 made of suitable flexible material such as natural or synthetic rubber and synthetic resins having flexible or elastomeric characteristics which, when in tube form, may be constricted by a modest application of pressure, the choice of material being dependent upon the character of the material flowing therethrough. It further includes a pressure mechanism 18 disposed about the tube 10. As shown in Figure 3, it consists of a cylindrical member 20 having one side or base 22 which has a circular opening 24 therein. Base 22 has an outwardly extending skirt or flange 26. The other side of cylinder 20 has a top portion or cap 28 bolted to cylinder 20, having disposed therein an opening 30 and skirt 32 of a structure similar to opening 24 and skirt 26, respectively, of base portion 22. A flexible tube portion 34, of suitable elastomeric material such as rubber, passes through openings 24 and 30 and the ends thereof are wrapped about skirt portions 26 and 32 and are secured thereto in fluid tight relation by means of clamps 36 and 38 to form a chamber 40 between cylinder 20 and flexible tube 34. An opening 42 is provided in a wall of cylinder 20 whereby fluid pressure such as compressed air or other gas or liquid under pressure may be admitted to chamber 40 which is operative to expand tube 34 inwardly.

As shown in Figure 1, the material carrying flexible tube portion 10 passes through openings 24 and 30 and extends through the chamber 40 whereby fluid pressure admitted to chamber 40 is operative to distort flexible tube portion 34 inwardly and thereby constrict material carrying tube 10 so as to reduce the flow of material therethrough.

As shown in Figure 1, the control apparatus 18 may advantageously be used in a system wherein it is desired to automatically reduce the flow of material to a supply tank when the material therein reaches a predetermined level. In this instance, the material, the flow of which is to be controlled, is of an electrolytic character. The opening 42 of expansible chamber 40 is connected to a source of fluid pressure, as, for example, an air pressure tank (not shown), through a valve 44. Valve 44 is opened or closed by means of a lever means 46 which is actuated by a solenoid 48. Solenoid 48 has one lead thereof electrically connected to the metal tank 14 through a battery 50 and the other lead thereof connected to a contact 52 which is insulated from tank 14. Thus, it may readily be seen that, in operation, when the electrolytic material comes in contact with contact 52, the electrical circuit is closed which causes the core of solenoid 48 to move downwardly to open valve 44 whereby fluid pressure is admitted to chamber 40 of pressure mechanism 18 to constrict tube 10 and reduce the flow of material therethrough.

The present fluid flow control mechanism may be advantageously utilized in various fluid flow systems and for various purposes. Various means may be employed to actuate valve 44 in response to various conditions in a containing device such as tank 14, as, for example, the level of the material therein or the pressure in the tank. One example of the use of the present device is shown in the application, Serial No. 535,136, now abandoned, assigned to the assignee of the present invention and filed concurrently herewith, wherein the fluid pressure is admitted to chamber 40 in response to the capacitance across a continuous rubber mold chamber whereby the level of foam rubber latex in the mold is effectively controlled.

It is obvious that the present invention is applicable to control the flow of various materials of a gaseous and liquid nature. It may also be applied to the control of the flow of material such as finely divided solids as, for example, where solids flow through a conduit under the force of gravity. However, flow of relatively viscous material as, for example, rubber latex is ideally controlled by the present apparatus.

While the embodiments of the present invention as herein disclosed constitute preferred forms, it is to be understood that other forms might be adopted.

What is claimed is as follows:

1. An apparatus for controlling the level of fluid in a container where the fluid is being continuously withdrawn therefrom, comprising in combination; a container having an inlet and an outlet, a fluid source for supplying fluid under pressure to said container, conduit means for connecting the fluid source with the inlet of said container, a device for continuously controlling the flow of fluid interposed in said conduit means, and outside of said container, said device comprising, a first unrestricted, collapsible and flexible tube, a second unrestricted and collapsible, flexible tube telescoped over the first-mentioned tube, a casing having a pair of aligned openings therein for receiving portions of said tubes therethrough and including a chamber surrounding the portions of said tubes which pass therethrough, securing means associated with said openings for clamping the second flexible tube in fluid-tight relation to the walls of said casing, means for admitting fluid under pressure to said chamber and around said tubes whereby the tubes are constricted for reducing flow of fluid therethrough whereby a supply of fluid to said container is varied, and control means associated with the container and sensitive to the level of fluid therein for controlling said means for admitting fluid to said chamber whereby the flow of fluid through said tubes is varied in direct accordance with the level of fluid in said container.

2. An apparatus for controlling the level of fluid in a container where the fluid is being continuously withdrawn therefrom, comprising in combination; a container having an inlet and an outlet, a fluid source for supplying fluid under pressure to said container, conduit means for connecting the fluid source with the inlet of said container, a device for continuously controlling the flow of fluid interposed in said conduit means and outside of said container, said device comprising, a first elastomeric tube interposed in said conduit means, a second elastomeric tube telescoped over a portion of the first-mentioned tube, a casing surrounding a portion of the first-mentioned tube and the second-mentioned tube and including end bosses thereon and a chamber therein which surrounds the tubes passing therethrough, clamping means for clamping portions of the second-mentioned tube to said bosses for sealing said chamber, conduit means for applying fluid pressure to said chamber from an independent fluid source and control means sensitive to the quantity of fluid in said container for controlling the flow of fluid through said conduit means to said chamber whereby the elastomeric tubes are constricted variably for changing the flow therethrough in accordance with the quantity of fluid in said container.

References Cited in the file of this patent

UNITED STATES PATENTS

| | | |
|---|---|---|
| 430,968 | Minor | June 24, 1890 |
| 465,212 | Schilling | Dec. 15, 1891 |
| 1,346,898 | Kingsbury | July 20, 1920 |
| 2,310,298 | Kuhl | Feb. 9, 1943 |
| 2,317,376 | Grove | Apr. 27, 1943 |
| 2,446,620 | Swallow | Aug. 10, 1948 |
| 2,535,569 | Toensfeldt | Dec. 26, 1950 |
| 2,590,215 | Sausa | Mar. 25, 1952 |
| 2,756,959 | Hill | July 31, 1956 |
| 2,766,765 | Bolanowski | Oct. 16, 1956 |